US011967226B2

(12) United States Patent
Ferenchak

(10) Patent No.: US 11,967,226 B2
(45) Date of Patent: Apr. 23, 2024

(54) AUTOMATED VEHICLE NOISE POLLUTION DETECTION AND RECORDING DEVICE

(71) Applicant: Nicholas Nathan Ferenchak, Albuquerque, NM (US)

(72) Inventor: Nicholas Nathan Ferenchak, Albuquerque, NM (US)

(73) Assignee: NOT-A-LOUD LLC, Albuquerque, NM (US)

( * ) Notice: Subject to any disclaimer, the term of this patent is extended or adjusted under 35 U.S.C. 154(b) by 355 days.

(21) Appl. No.: 17/328,327

(22) Filed: May 24, 2021

(65) Prior Publication Data

US 2021/0375126 A1 Dec. 2, 2021

Related U.S. Application Data

(60) Provisional application No. 63/030,921, filed on May 28, 2020.

(51) Int. Cl.

*G08G 1/01* (2006.01)
*G08B 21/18* (2006.01)
*G08B 25/10* (2006.01)
*G08G 1/017* (2006.01)

(52) U.S. Cl.

CPC ......... *G08G 1/0112* (2013.01); *G08B 21/182* (2013.01); *G08B 25/10* (2013.01); *G08G 1/0175* (2013.01)

(58) Field of Classification Search

CPC .. G08G 1/0112; G08G 1/0175; G08G 21/182; G08G 25/10
USPC ................................................ 701/1; 73/1.46
See application file for complete search history.

(56) References Cited

U.S. PATENT DOCUMENTS

| | | | | |
|---|---|---|---|---|
| 3,661,224 | A * | 5/1972 | Allen | G08G 1/0175 73/647 |
| 4,277,980 | A | 7/1981 | Coats et al. | |
| 4,287,771 | A | 9/1981 | Dugot | |
| 6,504,490 | B2 | 1/2003 | Mizushima | |
| 6,997,057 | B2 * | 2/2006 | Noel | B60R 11/02 73/647 |
| 7,151,835 | B2 | 12/2006 | Yonovitz et al. | |
| 7,270,006 | B2 | 9/2007 | Sper | |
| 7,401,519 | B2 | 7/2008 | Kardous | |
| 7,882,743 | B2 | 2/2011 | Goldberg et al. | |
| 8,555,721 | B2 * | 10/2013 | Taillet | G01H 3/12 73/579 |
| 9,148,739 | B1 * | 9/2015 | Farahat | G01H 3/14 |
| 9,389,118 | B2 * | 7/2016 | Taillet | G01H 3/10 |
| 10,311,894 | B2 | 6/2019 | Yu et al. | |
| 10,440,471 | B2 * | 10/2019 | Robbins | G06V 20/52 |
| 10,726,863 | B2 * | 7/2020 | Yu | G06F 16/51 |
| 2010/0245568 | A1 * | 9/2010 | Wike, Jr. | G08G 1/0175 348/149 |

(Continued)

*Primary Examiner* — Joshua E Rodden
(74) *Attorney, Agent, or Firm* — Reed Smith LLP; William Salinger; Matthew P. Frederick

(57) ABSTRACT

A device for detecting and recording violation of vehicle noise laws. The device includes one or more sound level sensors, cameras, microphones, microcontrollers, electronic data storage, user interfaces, and internal power sources. The device requires no operator, external power source, or information network connection and its design protects against weather, theft, and vandalism.

5 Claims, 8 Drawing Sheets

(56) References Cited

U.S. PATENT DOCUMENTS

2016/0277863 A1* 9/2016 Cahill .................. G01S 3/8083
2019/0281935 A1* 9/2019 Gharabegian .......... G05B 15/02

* cited by examiner

Automated Vehicle Noise Pollution Detection and Recording Device

AUTOMATED VEHICLE NOISE POLLUTION DETECTION AND RECORDING DEVICE

RELATED U.S. APPLICATION DATA

Provisional application No. 63/030,921, filed on May 28, 2020.

TECHNICAL FIELD OF THE INVENTION

The present invention relates to vehicle noise monitoring and surveillance, and more particularly to a device for detecting and recording violations of vehicle noise laws.

BACKGROUND OF THE INVENTION

As modern societies urbanize, noise pollution has become increasingly problematic. Noise pollution has been linked to health issues such as hypertension and hearing loss and has significant economic impacts in terms of lost productivity and reduced property values. Motor vehicles are a major source of noise pollution. Many local and state governments have laws aimed at combatting vehicle noise pollution. Unfortunately, enforcement of these laws is hindered by the need for equipment capable of detecting and recording vehicle noise violations.

There are two primary shortcomings of current vehicle noise violation enforcement systems, methods, and devices: the need for an operator and complexity. Many sound level meters exist that are capable of vehicle noise enforcement. However, many of these existing devices require an operator, trained in the use of the device, to be present while monitoring. This presence is required for the operation of the device itself and/or to record noise sources. Having a device that requires trained personnel to wait for relatively infrequent occurrences is not an economically feasible solution. Devices that require an operator for noise violation monitoring are known and disclosed in U.S. Pat. Nos. 4,277,980, 4,287,771, 6,504,490, 7,270,006, 7,151,835, 7,401,519, 7,882,743, and 9,389,118.

Systems and methods exist that automate this enforcement process, eliminating the need for an operator. However, these existing automated systems are complex and not ideal for public agencies with personnel that lack technical training. Current automated systems consist of backend service servers, steered beamformers, communication transmitters/receivers, network switches, modems, position tracking devices, and so on. Installation of these systems that consist of upwards often separate devices is outside the abilities of a layperson and sometimes require concrete footers, welding, or devices that are embedded into the roadway. Maintenance of these systems similarly require advanced technical training for the devices. Such multi-device systems often require their own external power sources and inter-device communication through information networks. Reliance on external power sources and inter-device communication through information networks introduces a critical opportunity for failure. Furthermore, many of these existing systems consist of devices that are not weatherproof and do not adequately protect against vandalism or theft, which is necessary for a device that will be installed in the field. Systems and methods such as those described in this paragraph are known and disclosed in U.S. Pat. Nos. 3,661,224, 6,997,057, 9,148,739, 10,311,894, and 10,440,471. An automated device for detecting and recording vehicle noise violations that can be installed and maintained without technical training and that addresses the aforementioned issues is desired.

BRIEF SUMMARY OF THE INVENTION

The present invention provides a device for detecting vehicle noise violations and automatically recording the sources of the violations. The present invention comprises one or more sound level sensors, cameras, microphones, microcontrollers, electronic data storage, user interfaces, and internal power sources. When a noise that meets or exceeds a user-determined threshold is sensed by a sound level sensor, a microcontroller sends an electronic signal to one or more cameras and microphones to record video and audio of the source. The video, audio, and sound level sensor readings are saved to internal electronic data storage. The device is automated and does not require an operator once installed and activated, which can easily be done by a layperson without additional equipment. The device has its own power source and internal memory, alleviating the need for external power sources or connection to information networks and providing for nearly limitless latitude in installation. The design of the device includes one or more enclosures that are weatherproof and protect against theft and vandalism. This addresses the aforementioned issues with the prior art.

In a preferred embodiment of the invention, the device is continually exposed to external noise from the environment and a sound level sensor measures the noise at a set frequency, typically about four times per second. Noise levels are typically specified in terms of A—weighted decibels (dBA) since A—weighting measurements account for the noise response of the human ear and are generally used for vehicle noise violation laws. However, other weighted measurements may be used. The user can set the decibel threshold at which the device should trigger using an interface on the device or through communication from an external device such as a smartphone or computer. When a noise that meets or exceeds a user-predetermined threshold decibel level is detected by the sound level sensor, an electronic signal is sent by a microcontroller to trigger one or more cameras and microphones. The device is designed to face a monitored roadway so that once the cameras and microphones are triggered, video and audio of the roadway will be recorded for a set amount of time, typically about ten seconds, capturing the license plate of the offending vehicle. The video and audio are saved onto internal removable electronic data storage. The decibel reading, date, and time throughout the recording event are concurrently saved to a spreadsheet on the internal removable electronic data storage. Law enforcement may use this license plate, decibel, date, and time information to generate citations. Power is provided by batteries internal to the device. The device may also utilize external power sources, connect to information networks, or connect to other similar devices, although the internal power source and internal electronic data storage ensure that these external functions are not required for the successful operation of the device.

In a preferred embodiment of the invention, the front face and rear face of one or more of the device enclosures are hinged so that the device can be opened and internal components can be accessed. There is a gasket at the joint where the front and rear faces of the enclosures contact so that the device is weatherproof. The device enclosure or enclosures have an opening for a camera or cameras. The camera opening has a clear cover that will not obstruct the camera's view but will protect against weather and vandalism. The sound level sensor protrudes from a recessed dome-shaped notch on the bottom face of the enclosure or enclosures so that while the sensor is openly exposed to the atmosphere and sound is not dampened, the sensor is protected from water and dust. These aspects of the enclosure design ensure that the device is weatherproof. A padlock hasp integrated into the device enclosure or enclosures allows for the front and rear faces to be locked together, preventing theft and vandalism. A cable pass-through integrated into the device enclosure or enclosures allows the device to be affixed and locked to an object.

Further features and advantages of the invention will become more readily apparent from the following detailed description when taken in conjunction with the accompanying drawings.

DETAILED DESCRIPTION OF THE PREFERRED EMBODIMENTS

Figure 1:
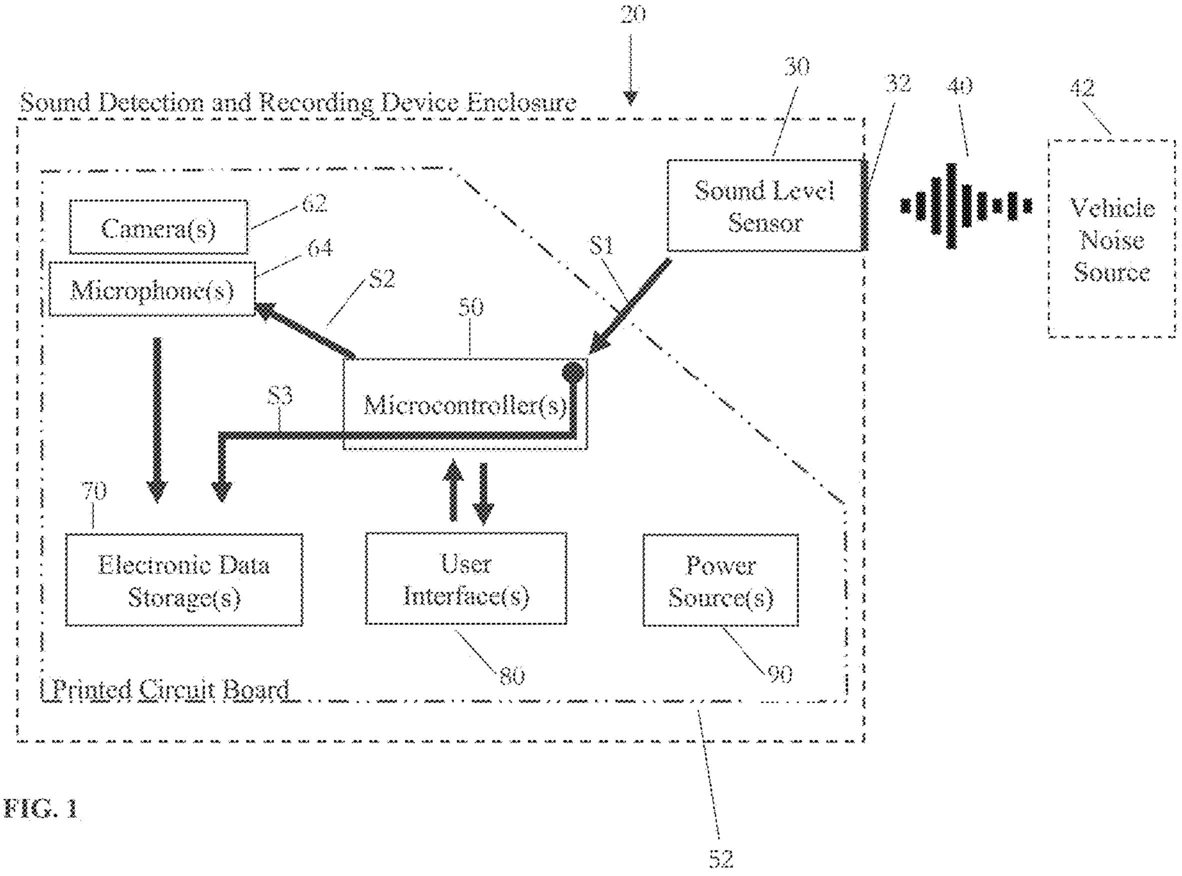
FIG. 1 is a block diagram of the components of the invention when the sound level sensor is internal to the enclosure.

While this invention is susceptible to embodiment in many different forms, there are shown in the drawings, and will be described herein in detail, a specific embodiment of the invention that has been satisfactorily used in a functioning model. There is an understanding that the present disclosure is to be considered as an exemplification of the principles of the invention and is not intended to limit the invention to the specific embodiment illustrated.

Figure 2:
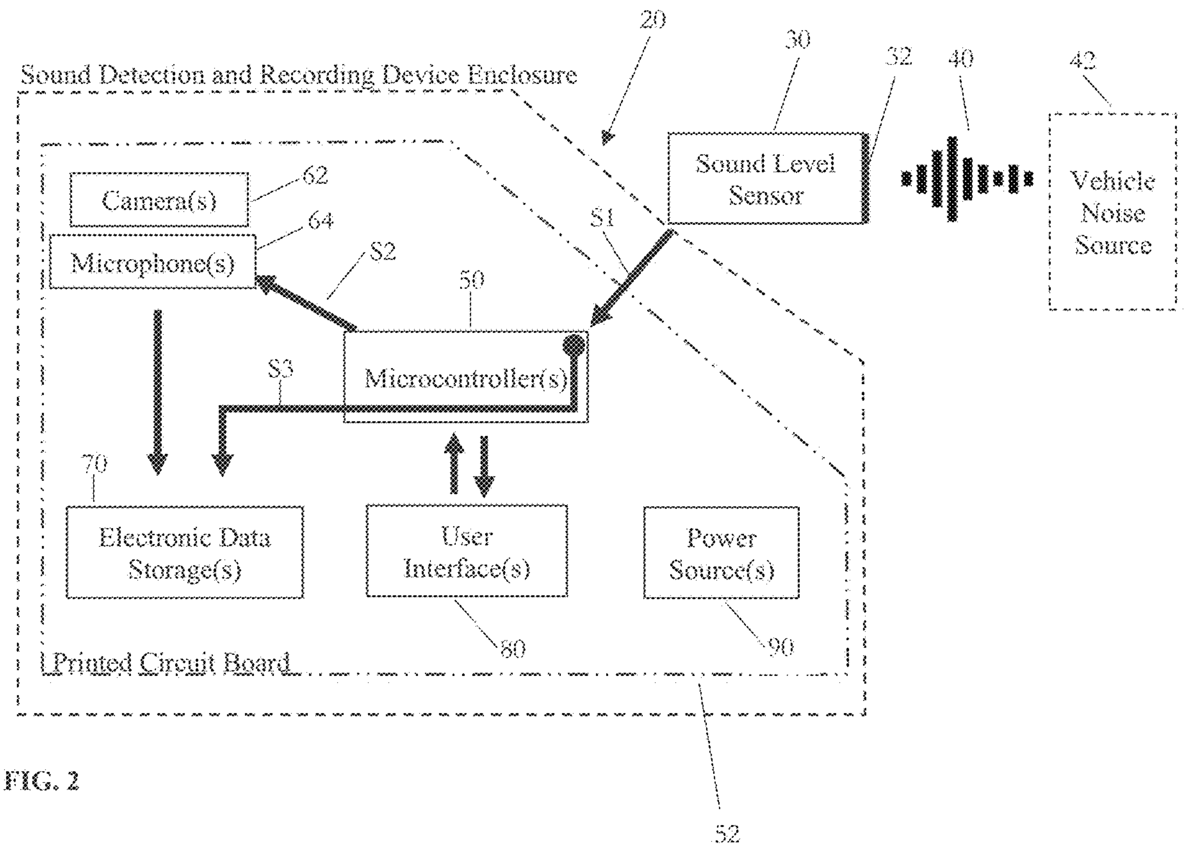
FIG. 2 is a block diagram of the components of the invention when the sound level sensor is external to the enclosure.

FIG. 1 and FIG. 2 illustrate the components of the sound detection and recording device 20 in accord with the present invention. A sound level sensor 30 either internal or external to the device is continually exposed to sound pressure 40 in the environment. The device is ideally placed near the edge of a roadway so that sound pressure 40 from vehicle noise sources 42 can be detected. Some local and state laws specify that a monitoring device must be placed at least fifty feet from the roadway, but exact positioning will be determined by individual users of the device. The device may also be placed on a moving object such as a motor vehicle or drone.

Figure 5:
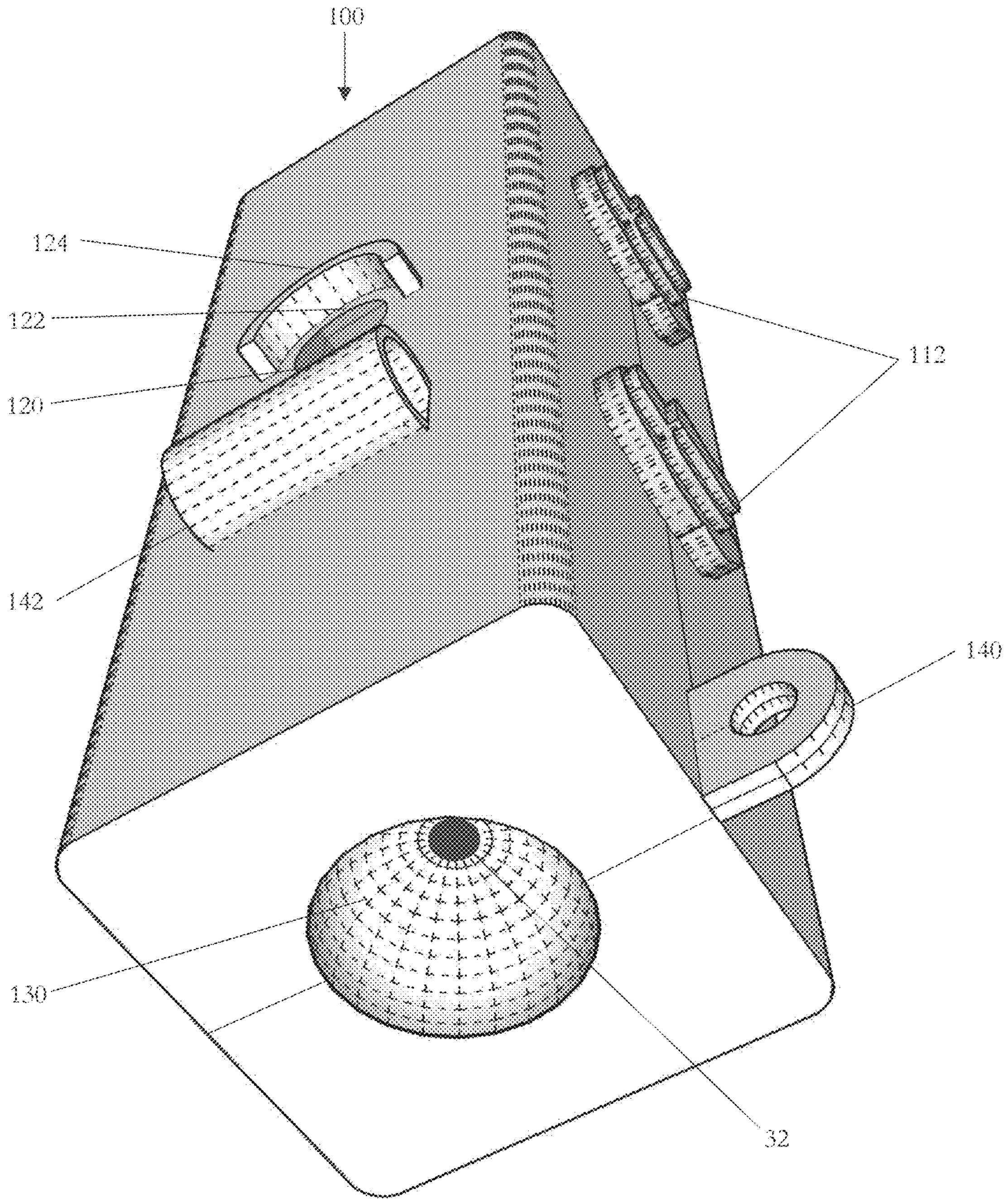
FIG. 5 is a perspective view of the bottom side of an embodiment of the invention with a single camera.
Figure 8:
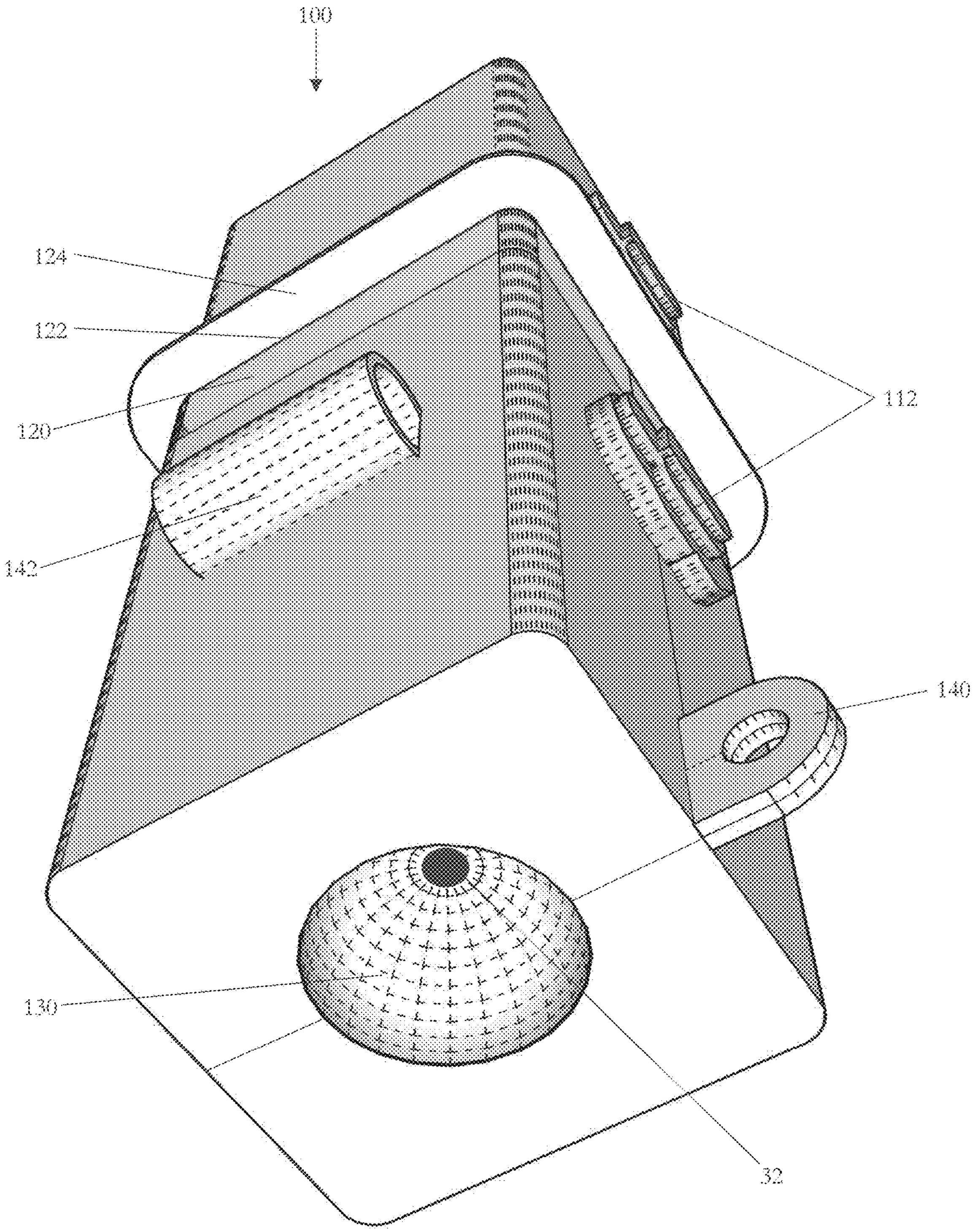
FIG. 8 is a perspective view of the bottom side of an embodiment of the invention with multiple cameras.

If the body of the sound level sensor 30 is internal to the device, the device enclosure has an opening 32 so that the sensor is exposed to the environment to prevent the sound pressure 40 from being artificially dampened, as detailed further in FIG. 5 and FIG. 8. The sound level sensor 30 is most likely but not limited to calibration to American National Standards Institute (ANSI) Type 2 or similar standards in accordance with local or state law where the invention will be employed. Such a sound level sensor may be like that disclosed in U.S. Pat. No. 7,270,006 which is herein incorporated for reference.

The sound level sensor 30 takes a reading of the sound pressure 40 at a set rate of time, typically about four times per second. Noise levels are generally measured in A-weighted decibels (dBA) since A-weighting measurements account for the noise response of the human ear and are typically used for vehicle noise violation laws. The sound level sensor 30 linearly translates the dBA reading to a direct current analog signal S1. The signal S1 is typically sent about four times per second to a microcontroller 50 which is housed on a printed circuit board 52, although this frequency can vary based on users' specific needs. The sound level sensor 30 is connected to the printed circuit board 52 either through a removable connection that is able to convey direct current analog signals, such as a stranded wire or similar component, or through wireless communication. This allows the sound level sensor 30 to be removed from the device for calibration. If the precision or accuracy of the sound level sensor 30 has drifted and no longer meets required specifications, the individual component can be easily replaced. We anticipate certifying calibration of sound level sensors periodically to ensure that the device 20 continues to satisfy local and state laws.

A command loop is programmed into the microcontroller 50 so that if the sound level sensor's signal S1 is less than a set threshold, the microcontroller 50 continues reading the signal S1 approximately four times per second without taking other action. If the sound level sensor's signal S1 meets or exceeds the set threshold, the microcontroller 50 sends a signal S2 to activate one or multiple cameras 62 and microphones 64. The microcontroller 50 also translates the sound level sensor's direct current analog signal S1 back to dBA and forwards the signal to an electronic data storage 70. The forwarded sound level sensor signal translated back to dBA is referred to as S3. Once the violation is recorded, the command loop starts over and continues reading S1 approximately four times per second.

Electronic data storage 70 can take the form of an SD card or other non-volatile portable memory format and is integrated directly onto the printed circuit board 52. The device can also connect to the internet or cell phone service to transfer data remotely, but always contains and utilizes internal storage.

The user-defined decibel threshold will vary based on local and state laws. Users can adjust the decibel threshold setting through a user interface 80 integrated into the printed circuit board 52. In the preferred embodiment of the invention, the user interface 80 may take the form of a liquid crystal display (LCD) 16×2 interface or another similar embodiment. The decibel threshold setting can also be adjusted through remote connection to the device through a smartphone or other similar electronic apparatus.

In the preferred embodiment of the invention, when the cameras 62 and microphones 64 receive a triggering signal S2 from the microcontroller 50, the cameras 62 and microphones 64 will record video and audio. The user can adjust recording settings through a user interface 80 or through remote connection to the device through a smartphone or other similar electronic apparatus. Although settings will vary based on user needs, the video/audio will typically be approximately ten seconds in length. The video is typically about 480p resolution at 20-25 frames per second as in the functioning prototype of the invention. The camera 62 may also use infrared filters or black flashes to allow nighttime recording while avoiding driver distraction. The recorded video and audio are transferred to and saved on electronic data storage 70. The video and audio files are titled with the date and time when the noise offense was detected so that the video and audio can be paired with the decibel readings also saved to the electronic data storage 70. Date and time can be set through the user interface 80 or through remote connection to the device through a smartphone or other similar electronic apparatus.

In addition to video and audio being recorded for events above the decibel threshold, the forwarded sound level sensor signal converted back to dBA S3 and corresponding date and time are also recorded on the electronic data storage 70 approximately four times per second for the length of the recording. The forwarded sound level sensor signal S3 and date and time may be recorded as delimited text in a comma-separated values (CSV) file or other similar format on the electronic data storage 70.

The cameras 62 and microphones 64 are housed inside the sound detection and recording device 20. The sound detection and recording device 20 and cameras 62 should be positioned so that the cameras 62 will capture the license plate of the vehicle noise source 42 as the vehicle drives away. The device can be affixed to a stationary object or to a moving vehicle such as a motor vehicle or a drone. Although an exhaust backfire, gunshot, or other loud noise may trigger the microcontroller 50, the video and audio recordings will allow a user to determine the source of the noise.

The license plate video, audio, decibel, date, and time outputs can be used to generate a citation or for general research, but how a specific user utilizes the outputs is up to the user. Other embodiments may automate citation generation or other implementations of the outputs. Such embodiments may connect to information networks or other devices, although internal electronic data storage ensures that the device will successfully operate regardless of such connections.

All components integrated onto the printed circuit board 52 are powered with an internal power source 90 that is also integrated onto the printed circuit board 52. The power source 90 consists of two AA batteries, which should power the device for several months under typical operating conditions. The device turns on when the batteries are inserted. Because the device only records offending vehicles, operation of the device is efficient in terms of power usage. The microcontroller 50 is able to function in various power modes, allowing it to have low power consumption. This characteristic allows the device to function in any typical outdoor environment and avoid overheating. Some embodiments of the invention may also utilize permanent or external power sources, but the internal power source will always ensure that the device will operate even if the permanent or external power sources fail.

Figure 3:
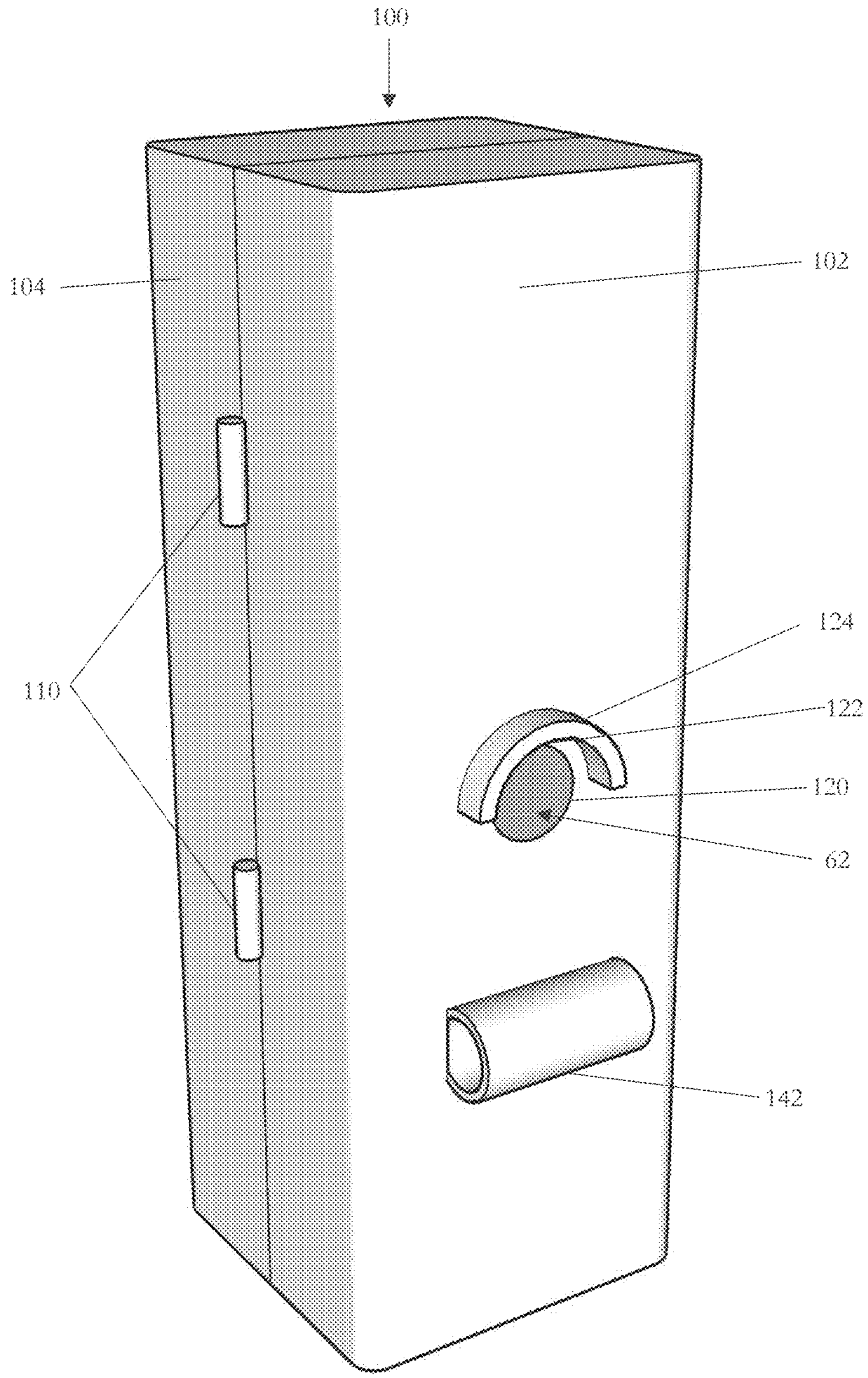
FIG. 3 is a perspective view of the front and left side of an embodiment of the invention with a single camera.
Figure 4:
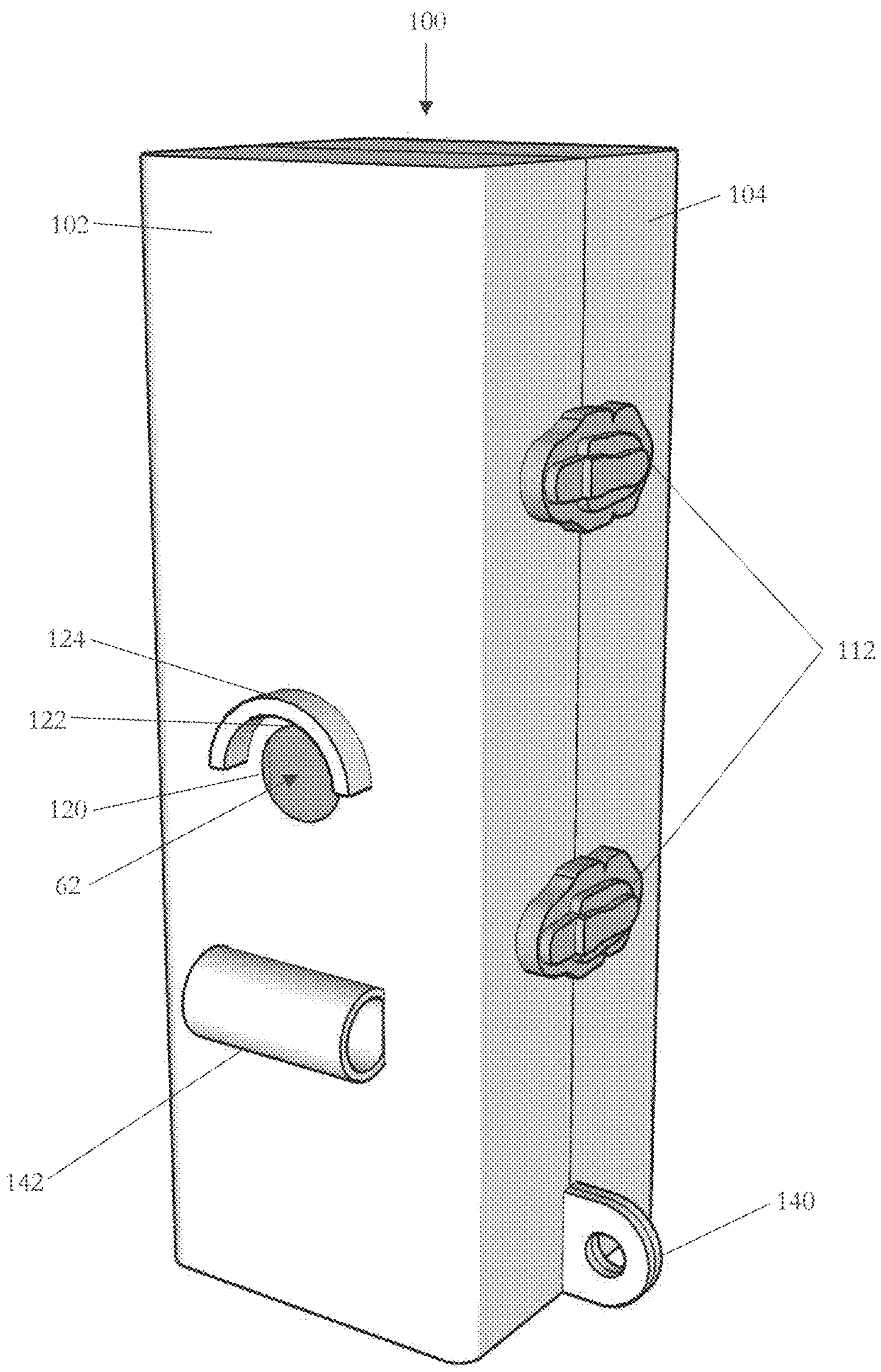
FIG. 4 is a perspective view of the front and right side of an embodiment of the invention with a single camera.
Figure 6:
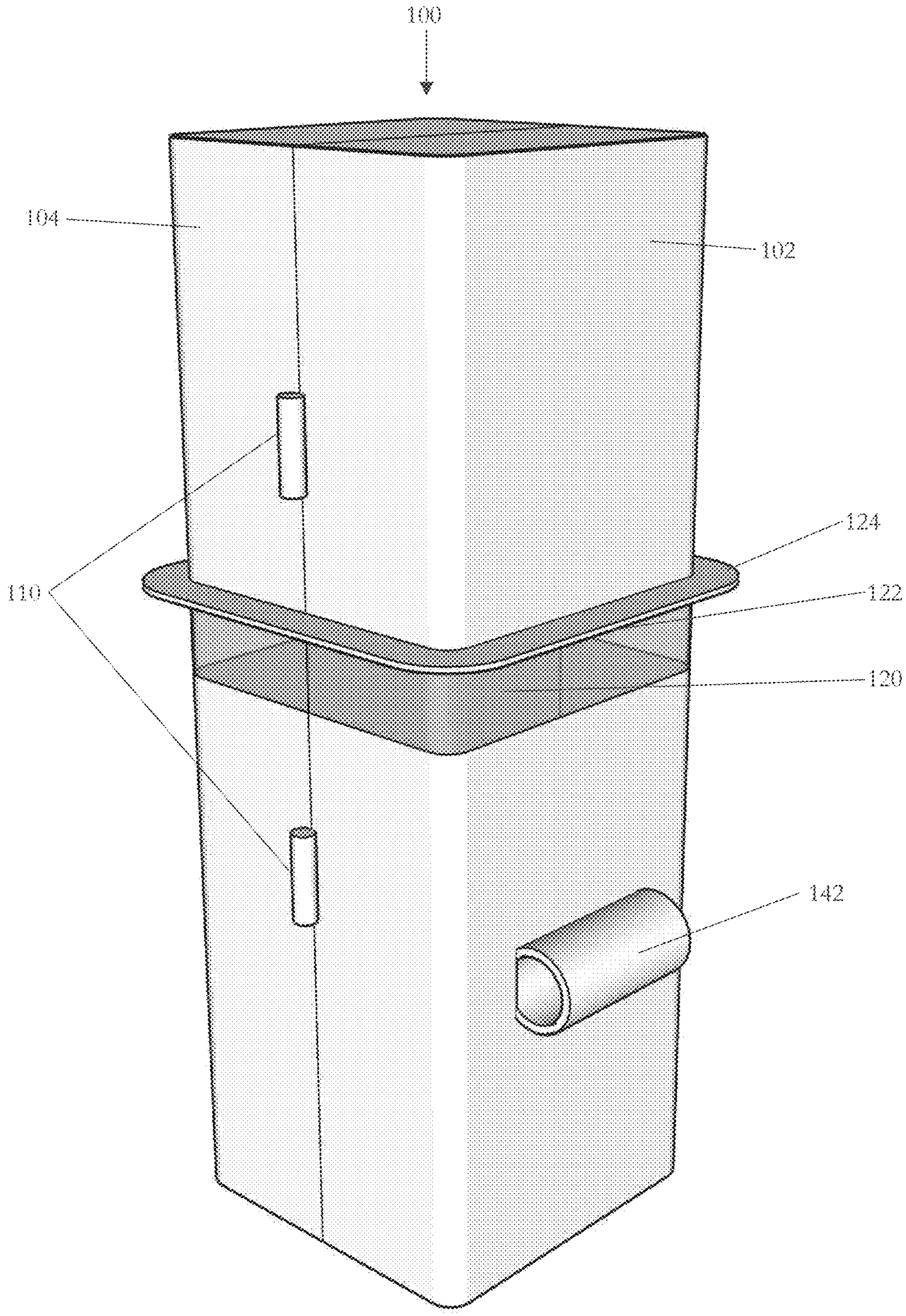
FIG. 6 is a perspective view of the front and left side of an embodiment of the invention with multiple cameras.
Figure 7:
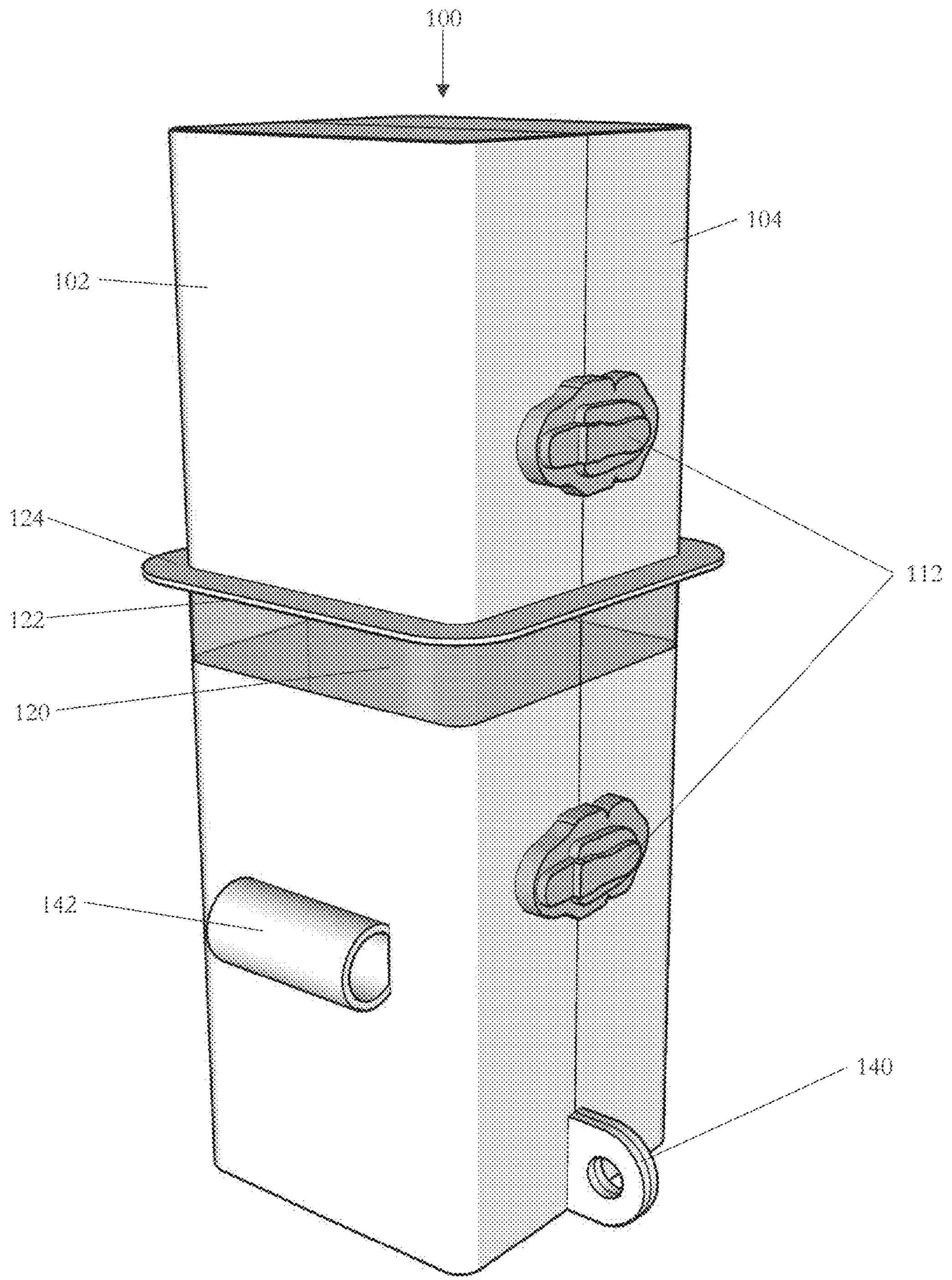
FIG. 7 is a perspective view of the front and right side of an embodiment of the invention with multiple cameras.

FIGS. 3-5 illustrate the front, left, right, and bottom sides of one example of a possible embodiment of the invention's enclosure 100 when a single camera and microphone are being used. FIGS. 6-8 illustrate the front, left, right, and bottom sides of one example of a possible embodiment of the invention's enclosure 100 when multiple cameras and microphones are being used. The front face 102 and the rear face 104 of the device enclosure 100 are connected with hinges 110 so the enclosure can be opened to access internal components 20. The front face 102 and rear face 104 are held together with latches 112. The joint where the front face 102 and rear face 104 contact has a gasket to ensure that the device is waterproof. The current embodiment has two hinges and two latches, but alternative embodiments are possible.

The enclosure 100 of the device has an opening 120 for at least one camera 62 and an opening 122 for at least one microphone 64. The single-camera opening 120 of the single-camera device in FIGS. 3-5 is on the front face 102 of the enclosure 100 and is large enough to allow a single camera to view noise violations. The enclosure 100 of the multi-camera device in FIGS. 6-8 has a camera opening 120 that extends around the enclosure 100 to allow multiple cameras to view noise violations. The camera opening 120 has a clear cover that will not obstruct the camera's view but will protect against weather and vandalism.

The microphone opening 122 will consist of a small cavity in the case with an aperture approximately 1/16" wide. Because the microphone opening 122 is sealed from the rest of the internal components 20 with a gasket, water and dust cannot enter the device. An overhang 124 over the openings further prevents water from obstructing the camera and from water or dust from entering the device.

In an embodiment of the invention as illustrated in FIG. 5 and FIG. 8, the sound level sensor 30 protrudes from an opening 32 at the top of a recessed dome 130 on the bottom face of the enclosure 100. While the sound level sensor 30 remains openly exposed to the environment and sound is not artificially dampened, the sensor is protected from water and dust. A foam pad may be placed in the recessed dome 130 to prevent artificial amplification of noise and to further avoid water and dust corrupting the sound level sensor 30. The recessed notch may take different shapes or forms but continues to function as protection for the sound level sensor 30 from the elements. In another embodiment, the sound level sensor may be separate from the printed circuit board 52, cameras 62, and microphones 64 in its own separate enclosure and communicate with the former through wires or wireless connections.

A padlock hasp 140 integrated into the enclosure 100 allows for the front face 102 and rear face 104 to be locked together, preventing theft and vandalism. The hasp will accommodate padlocks including but not limited to those with shackles of 5/16" standard diameter. A cable pass-through 142 integrated into the enclosure 100 accommodates a cable that can then allow the device to be affixed and locked to a stationary or moving object. The cable pass-through is approximately ½" thick, although alternative embodiments are possible. The padlock hasp 140 and cable pass-through 142 will be molded with the rest of the enclosure 100, reducing the chance of theft or vandalism.

Initial prototypes of the enclosure will be 3D printed and most likely consist of a durable yet strong plastic such as Acrylonitrile Butadiene Styrene (ABS). Future iterations will utilize injection molding to scale production of the device. The current embodiment of the enclosure is approximately 11"×3"×3", although alternative configurations may result in varying embodiments.

It should be understood that the invention described herein can be packaged in various manners and various modifications and extensions can be made using the teaching of this invention to suit the convenience of a given manufacturer or user. With respect to the use of plural and/or singular terms herein, those having skill in the art can translate from the plural to the singular and/or from the singular to the plural as is appropriate to the context and/or application. Electronic circuitry, component configurations, memory format, power source, signal format, enclosure design, and/or programming may have varying embodiments by those within the art. The particular embodiment detailed above was utilized in a functioning model and found to be satisfactory.

While an embodiment of the device is self-enclosed, multiple such devices may be connected together to improve accuracy or precision of the collected data. However, connecting multiple devices together is not necessary for the device's successful operation.

The invention claimed is:

1. A device for detecting and recording violations of vehicle noise laws comprising:

a sound level sensor for continually measuring sound levels;

a microcontroller housed on a printed circuit board and receiving input signals from said sound level sensor;

one or more cameras and microphones for capturing video and audio of a sound source;

one or more enclosures comprising:

a sound level sensor notch configured to prevent water and dust from corrupting the sensor;

a gasket at a joint between front and rear faces of the enclosure configured to render the enclosure weatherproof;

an overhang configured to prevent water from obstructing the camera and from water or dust from entering the device;

a cable pass-through configured to protect against theft and vandalism; and a padlock hasp configured to protect against theft and vandalism.

2. The device according to claim 1, wherein said camera and microphone are activated when said sound level sensor detects a sound that meets or is in excess of a user-determined threshold.

3. The device according to claim 1, wherein said device is an automated device, alleviating the need for the presence of a user while operating.

4. The device according to claim 1, wherein said device has internal electronic data storage, alleviating the need for inter-device communication through information networks.

5. The device according to claim 1, wherein said device has an internal power source, alleviating the need for an external power source.

* * * * *